(12) United States Patent
Goody

(10) Patent No.: US 7,031,324 B1
(45) Date of Patent: Apr. 18, 2006

(54) LOCAL AREA NETWORK/WIDE AREA NETWORK SWITCH

(75) Inventor: Steven H. Goody, Santa Rosa, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/484,985

(22) Filed: Jan. 18, 2000

Related U.S. Application Data

(60) Provisional application No. 60/125,528, filed on Mar. 22, 1999.

(51) Int. Cl.
- H04J 12/28 (2006.01)
- H04J 3/16 (2006.01)
- H04J 3/22 (2006.01)
- G06F 15/16 (2006.01)

(52) U.S. Cl. .............. 370/401; 370/351; 370/466; 709/228

(58) Field of Classification Search ........ 370/401–466, 370/400, 395.53, 395.5, 396, 395.1, 389, 370/901, 907, 364–369, 470–476, 501–518, 370/535–539, 351–395; 709/221–228, 245
See application file for complete search history.

(56) References Cited

U.S. PATENT DOCUMENTS

| | | | | |
|---|---|---|---|---|
| 5,838,681 A | * | 11/1998 | Bonomi et al. | 370/395.41 |
| 5,978,373 A | * | 11/1999 | Hoff et al. | 370/392 |
| 6,002,683 A | * | 12/1999 | Madonna | 370/353 |
| 6,014,708 A | * | 1/2000 | Klish | 709/232 |
| 6,044,088 A | * | 3/2000 | Rahman et al. | 370/465 |
| 6,122,281 A | * | 9/2000 | Donovan et al. | 370/401 |
| 6,222,848 B1 | * | 4/2001 | Hayward et al. | 370/412 |
| 6,266,333 B1 | * | 7/2001 | Kartalopoulos | 370/395.53 |
| 6,356,550 B1 | * | 3/2002 | Williams | 370/364 |
| 6,389,030 B1 | * | 5/2002 | Coden | 370/404 |
| 6,490,273 B1 | * | 12/2002 | DeNap et al. | 370/352 |
| 6,498,782 B1 | | 12/2002 | Branstad et al. | 370/231 |
| 6,587,470 B1 | * | 7/2003 | Elliot et al. | 370/404 |
| 6,603,769 B1 | * | 8/2003 | Thubert et al. | 370/401 |
| 6,615,402 B1 | * | 9/2003 | Kaneko et al. | 716/16 |
| 6,704,326 B1 | * | 3/2004 | Russell et al. | 370/466 |
| 6,775,263 B1 | * | 8/2004 | Hwang et al. | 370/350 |
| 2001/0054101 A1 | * | 12/2001 | Wilson | 709/225 |
| 2002/0101868 A1 | * | 8/2002 | Clear et al. | 370/389 |
| 2003/0131105 A1 | * | 7/2003 | Czeiger et al. | 709/225 |
| 2004/0174902 A1 | * | 9/2004 | Russell et al. | 370/466 |

* cited by examiner

Primary Examiner—Man U. Phan
(74) Attorney, Agent, or Firm—Aka Chan LLP

(57) ABSTRACT

A local area network/wide area network (LAN/WAN) switch is presented which aggregates LAN traffic onto SONET/SDH transport streams in a programmable manner. The system can concentrate Ethernet packets and map the data onto SONET streams at data rates varying from STS-1 to STS-12C. Depending on the bandwidth available in the WAN interface, different numbers and combinations of STS-n streams can be formed. The system allows for efficient and flexible mapping of LAN traffic onto a WAN for transport over fiber optic networks.

48 Claims, 8 Drawing Sheets

RATES

| COMBINATION NUMBER | STS-1 | 3C | 6C | 9C * | 12C |
|---|---|---|---|---|---|
| 1) | 12 | | | | |
| 2) | 9 | 1 | | | |
| 3) | 6 | 2 | | | |
| 4) | 3 | 3 | | | |
| 5) | | 4 | | | |
| 6) | 6 | | 1 | | |
| 7) | 3 | 1 | 1 | | |
| 8) | | 2 | 1 | | |
| 9) | | | 2 | | |
| 10) | 3 | | | 1 | |
| 11) | | 1 | | 1 | |
| 12) | | | | | 1 |

* OPTIONAL, NOT PRESENTLY USED

*FIG. 5*

| BIT | CONTENTS | R/W | DEFAULT VALUE |
|---|---|---|---|
| 15: | RESERVED | R | 0 |
| 14: | RESERVED | R | 0 |
| 13: | RESERVED | R | 0 |
| 12: | RESERVED | R | 0 |
| 11: | STS_12_CONCAT | R/W | 0 |
| 10: | STS_11_CONCAT | R/W | 0 |
| 9: | STS_10_CONCAT | R/W | 0 |
| 8: | STS_9_CONCAT | R/W | 0 |
| 7: | STS_8_CONCAT | R/W | 0 |
| 6: | STS_7_CONCAT | R/W | 0 |
| 5: | STS_6_CONCAT | R/W | 0 |
| 4: | STS_5_CONCAT | R/W | 0 |
| 3: | STS_4_CONCAT | R/W | 0 |
| 2: | STS_3_CONCAT | R/W | 0 |
| 1: | STS_2_CONCAT | R/W | 0 |
| 0: | STS_1_CONCAT | R/W | 0 |

*FIG. 6*

LOCAL AREA NETWORK/WIDE AREA NETWORK SWITCH

CROSS-REFERENCES

This application claims priority from U.S. Provisional Patent Application Ser. No. 60/125,528, entitled "Ethernet Concentration Apparatus", filed on Mar. 22, 1999. This application is incorporated herein by reference but is not admitted to be prior art.

BACKGROUND OF THE INVENTION

Local Area Networks (LANs) are used as the basis for communications between computers and other network elements in business, campus, and residential environments. The predominant protocol for LAN communications is Ethernet, which can be realized in a number of formats including 10BASE-TX, 100BASE-TX, 1000BASE-FX, and Gigabit Ethernet. The Ethernet physical and data link layer (Layer 1 and Layer 2) specifications define how computers can communicate information over the various types of physical connections which can include twisted wire pairs, coaxial cables, and fiber optic cables.

Wide Area Networks (WANs) are the means in which data is transmitted between locations, and can include the transmission of data between buildings or campuses. The data is typically transported over telecommunications circuits which are provided by Interexchange Carriers (IXCs, also known as long distance providers), Competitive Access Providers (CAPs), Incumbent Local Exchange Carriers (ILECs), and Competitive Local Exchange Carriers (CLECs). Although these circuits can exist in a number of formats and data rates, a commonly used format is the Synchronous Optical Network (SONET)/Synchronous Digital Hierarchy (SDH) standards developed for the transport of data over fiber optic networks. The SONET/SDH standards support the transport of data at data rates varying from 50 Mb/s (Synchronous Transfer Signal-1 (STS-1)) to 10 Gb/s (STS-192).

Present equipment provides for the ability to map Ethernet to SONET/SDH by providing Packet-Over-SONET (POS)/SDH Level 2 interfaces. These interfaces provide connectivity to Ethernet networks on one side of the interface, and connectivity to SONET/SDH networks on the other side of the interface. Present solutions provide the ability to map Ethernet into fixed bandwidth SONET/SDH transport pipes. This allows a customer to reserve a particular amount of WAN transport bandwidth in a fiber optic connection and to map the data onto that connection.

The shortcoming of the present solution is that the data is mapped into a single bandwidth connection, forcing the customer to reserve a particular amount of bandwidth in the fiber optic connection. If the bandwidth later proves to be inadequate due to growth, the customer will be required to replace the POS/SDH equipment and/or to lease additional bandwidth. If the customer purchases bandwidth and POS/SDH equipment having a bandwidth greatly in excess of what is presently needed, the costs may be excessively high. For the foregoing reasons, there is a need for a method and apparatus for flexibly mapping packet based LAN data onto a WAN connection.

SUMMARY OF THE INVENTION

In one embodiment of the present invention, a Local Area Network (LAN) to Wide Area Network (WAN) switch is disclosed. The LAN and WAN switch includes a programmable WAN port framer for accepting data from at least one LAN port and for flexibly mapping the data received from the LAN port into at least one WAN port. The data can be combined in different rate Synchronous Optical Network (SONET) circuits which are subsequently combined into a final SONET payload.

In one embodiment of the present invention, a method of transporting data from a LAN to a WAN in a re-configurable manner is disclosed. The received data is mapped into at least one LAN port. The received data is mapped into at least one Synchronous Transport Signal-1 (STS-1) transport stream and the stream is transmitted to at least one WAN port.

In one embodiment the LAN to WAN switch also includes a packet switch connected to the one LAN port for concentrating the traffic from the LAN ports.

In one embodiment of the method of transporting, the LAN data is concentrated prior to being mapped into transport streams.

In one embodiment the LAN to WAN switch includes a plurality of LAN ports and the packet switch create a virtual LAN from a subset of the ports.

In one embodiment of the method, LAN data is received from a plurality of LAN ports and a virtual LAN is formed from a subset of the plurality of LAN ports.

The present invention allows for a plurality of STS-1 transport streams to be created from a LAN input and transmitted over a WAN.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 5 illustrates the various combinations of STS-n payloads which can be formed from LAN data input using the present invention;

FIG. 6 illustrates the contents of the master register;

DETAILED DESCRIPTION OF THE PREFERRED EMBODIMENT

Figure 1A:
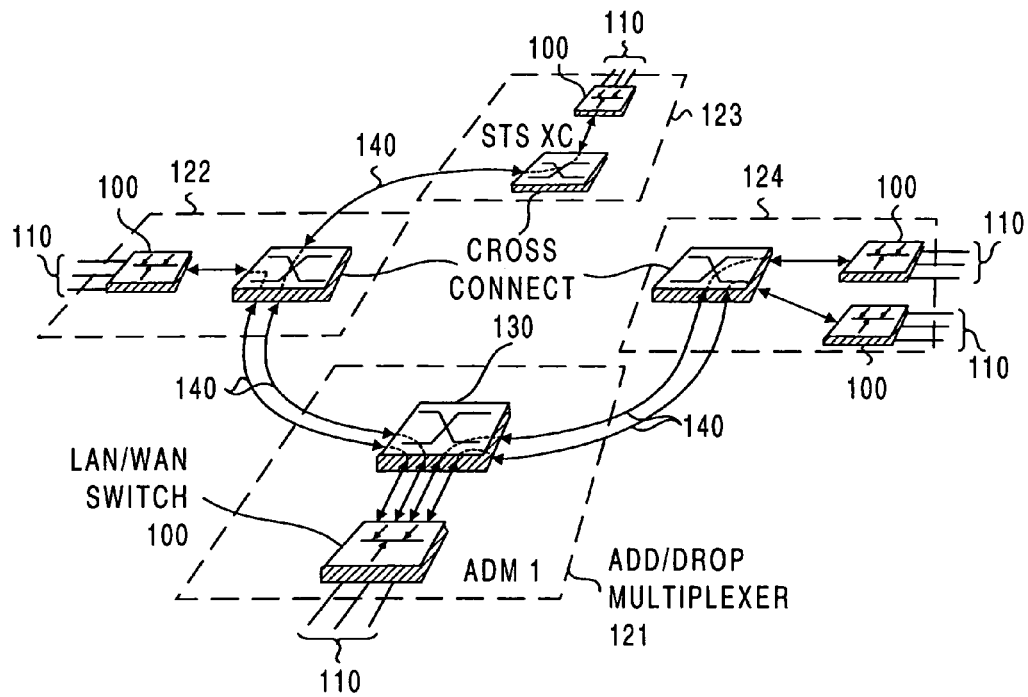
FIGS. 1A and 1B illustrate the use of the invention in hub and packet ring topologies respectively.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 8 in particular, the apparatus of the present invention is disclosed.

FIG. 1A illustrates the use of the invention in a hub network topology. In this topology, a Local Area Network/Wide Area Network (LAN/WAN) switch 100 is connected to a cross-connect 130, which can establish Synchronous Transfer Signal (STS)-paths 140 with other cross-connects. In a preferred embodiment, the LAN/WAN switch 100 and the cross-connect 130 form an add/drop multiplexor, which is considered to be a network element. As illustrated in FIG. 1A, a series of add/drop multiplexors can be configured in a ring configuration, including a first add/drop multiplexor 121, a second add/drop multiplexor 122, a third add/drop multiplexor 123, and a fourth add/drop multiplexor 124. In the hub configuration illustrated in FIG. 1A, a set of point-to-point links on STS-paths 140 interconnect multiple Ethernet cards. In a preferred embodiment, the Ethernet cards are plug-in units to LAN/WAN switch 100. The Ethernet cards may be located on various network elements. In the hub configuration shown in FIG. 1A, Ethernet cards which form part of add/drop multiplexors 122, 123, and 124 each have a single STS-path 140 to an Ethernet card located in the first add/drop multiplexor 121.

Ethernet cards can be based on a variety of data transport rates and physical interfaces and include but are not limited to 10BaseT, 100BaseT, or Gigabit Ethernet operating at 1 or 10 Gb/s, or data rates within that range. Because of the high speed nature of emerging Ethernet technology, it is necessary to be able to flexibly map the high data rate Ethernet signals onto WAN circuits, such as Synchronous Optical Network (SONET) or Synchronous Digital Hierarchy (SDH) circuits, for transport to other nodes. It is also possible to route SONET or SDH circuits within the node to establish connectivity between Ethernet cards.

Figure 1B:
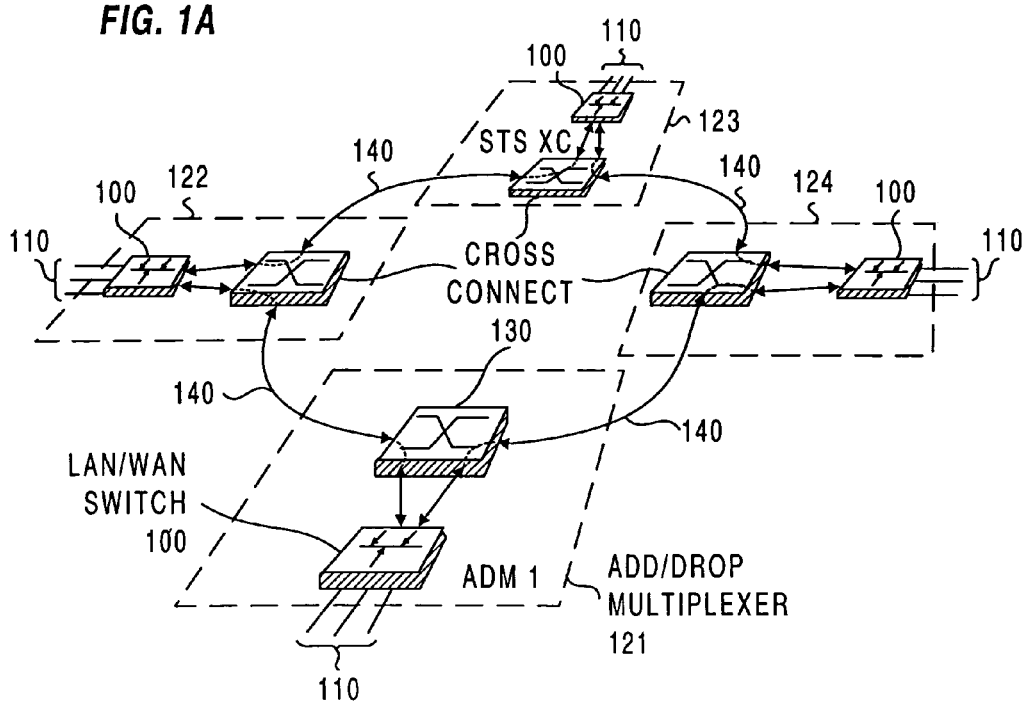

FIG. 1B illustrates the use of the invention in a packet ring topology in which multiple Ethernet cards join into a packet ring via a single shared STS-path 140 which exists between add/drop multiplexors 121, 122, 123, and 124. In this embodiment, LAN traffic from LAN ports 110 is mapped onto the shared STS-path 140. Although illustrated as a physical ring in FIG. 1B, the ring is typically broken using a spanning tree protocol, in order to prevent circular routing of Ethernet packets.

Figure 2:
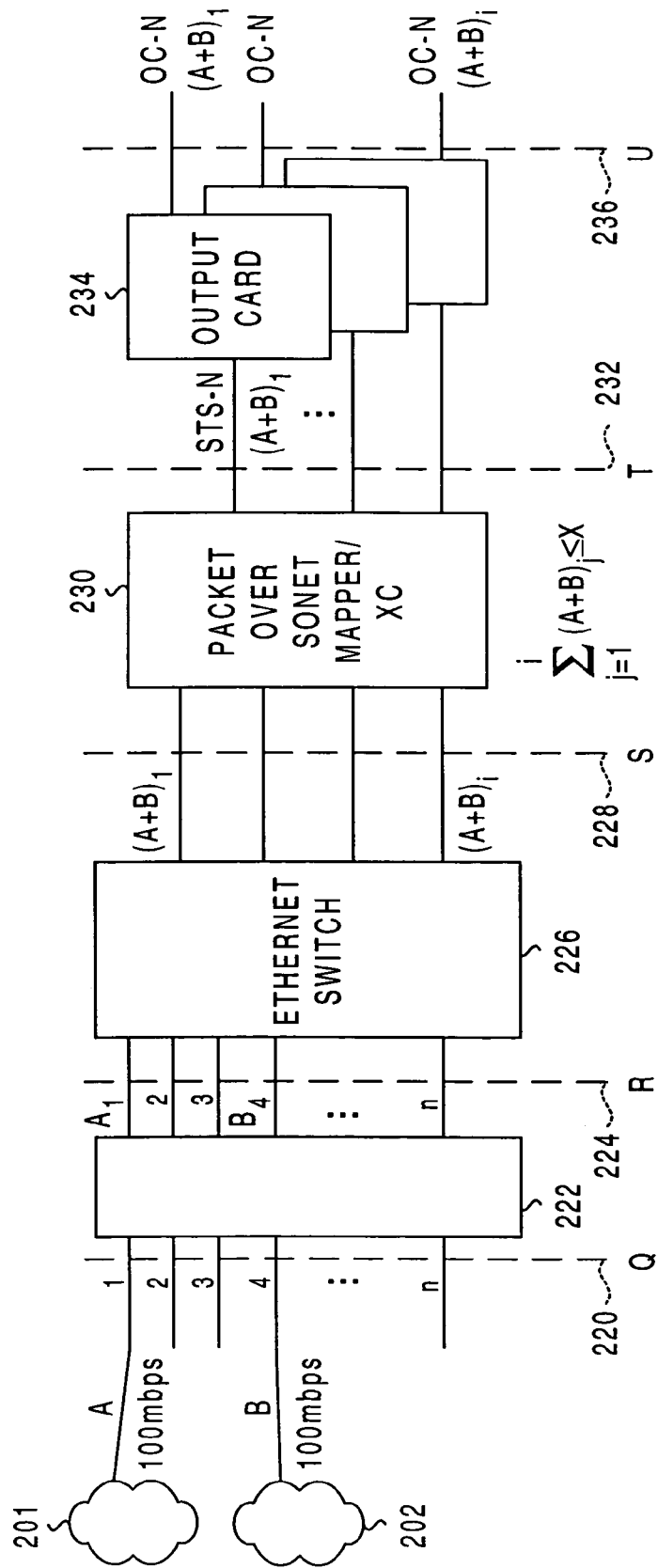
FIG. 2 illustrates a block diagram of a LAN to WAN switch including a cross-connect function.

FIG. 2 illustrates a block diagram of the invention, with interfaces being represented between the blocks as interfaces Q 220, R 224, S 228, T 232, and U 236. These labels are for convenience only and do not restrict the implementation or use of the invention in any way.

Referring to FIG. 2, a first LAN 201 and a second LAN 202 are connected to a LAN physical interface 222. The LAN physical interface 222 serves to terminate the physical connection which can correspond to a 10BASE-TX, 100BASE-TX, 1000BASE-FX, Gigabit Ethernet or other LAN physical connection. Data emanating from the other side of the LAN physical interface 222 and passing through the R interface 224 is in a format compatible with an Ethernet switch 226.

The functions of the Ethernet switch 226 include the aggregation and concentration of traffic from LANs connected to the LAN physical interface 222. In the example illustrated in FIG. 2, data is collected from the LAN A 201 and the LAN B 202 and is aggregated and concentrated into data streams $(A+B)_1$ through $(A+B)_i$ and passed across the S interface 228 to a Packet-over-SONET (POS) mapper/cross-connect 230. In a preferred embodiment, the concentration of traffic takes place in the Ethernet switch 226 and results in traffic across the S interface 228 such that the sum of the traffic passing across the S interface 228 is less than or equal to a specified data rate X. As an example, this rate can be 200 Mb/s and will restrict the total payload being sent to the POS mapper/cross-connect 230 to 200 Mb/s or less.

FIG. 2 illustrates how data can be collected from n ports on the Q interface 220, concentrated in the Ethernet switch 226 and presented across the S interface 228 to the POS mapper/cross-connect 230.

The POS mapper/cross-connect 230 performs the functions of mapping the data into the appropriate STS-n Streams, and routing the data, through the cross-connect function, across the T interface 232 to the appropriate output card 234. Output card 234 puts the data in a format that is suitable for transmission on a WAN as defined at the U interface 236. In a preferred embodiment, the output card 234 formats the signal in an Optical Carrier-n (OC-n) signal format having a data rate in the range of 51.84 Mb/s to 9.9 Gb/s.

One of the advantages of the present invention is that data from LANs can be aggregated and placed into an STS-path of varying bandwidth. As an example, a customer may initially have a requirement for collecting and aggregating LAN traffic to form a 51.84 Mb/s (STS-1) payload which is transmitted over an OC-1 connection. At a future date, the customer's data transport requirements may have increased, resulting in the need to transport 155.55 Mb/s of data. Using the present invention, the POS mapper/cross-connect 230 can allocate more bandwidth to that customer by mapping the data from the customer's LANs to an STS-3c (155.55 Mb/s) stream. The POS mapper/cross-connect 230 also permits the ability to route the STS-3c stream to an OC-3c output card which can support the 155.55 Mb/s data rate.

Figure 3:
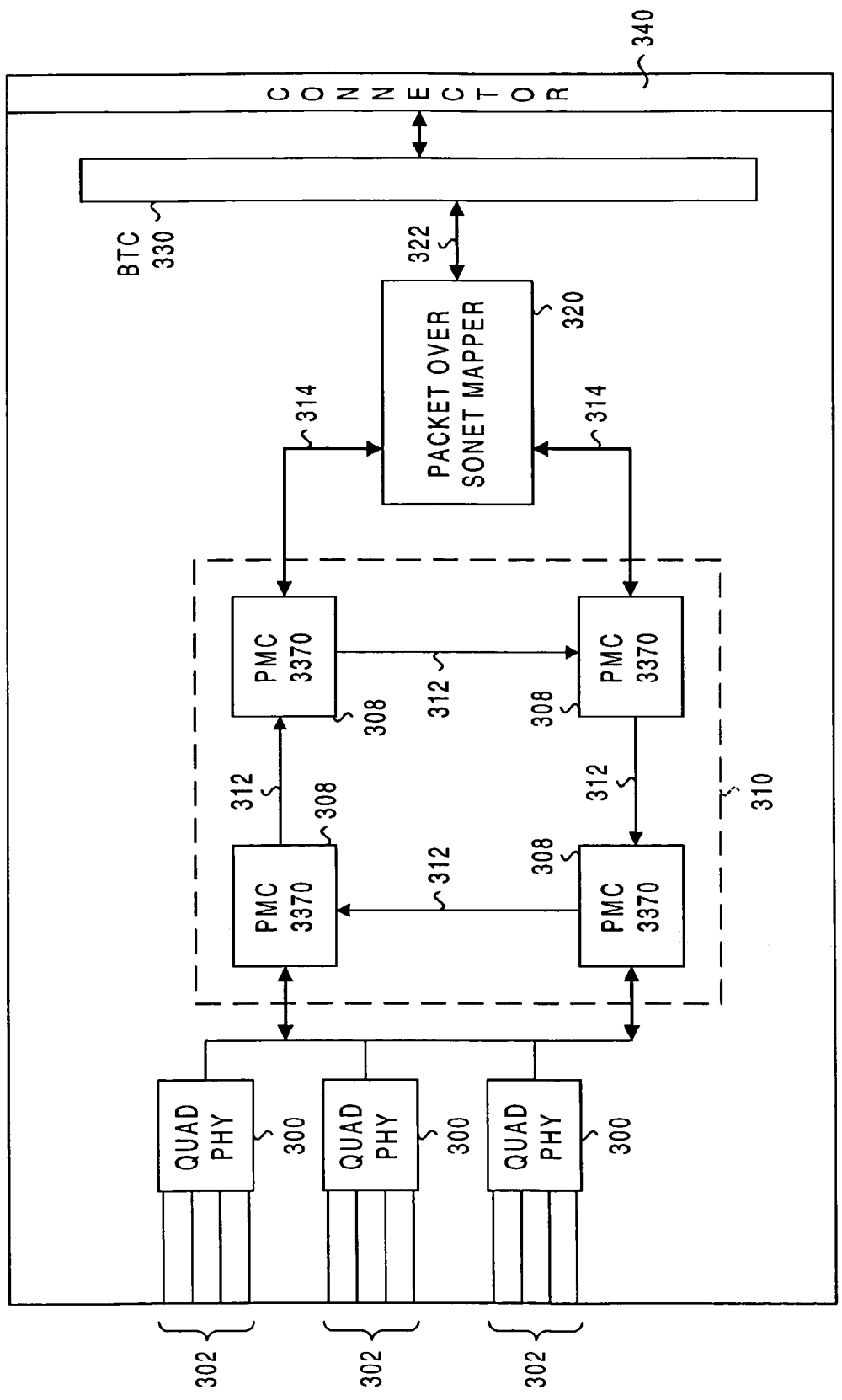
FIG. 3 illustrates a block diagram of an Ethernet card containing LAN to WAN functionality.

FIG. 3 illustrates a board which embodies the present invention. The board can be used as part of an overall SONET/SDH cross-connect system, such as that described in our co-pending U.S. patent application which is entitled "Flexible cross-connect with data plane", filed on Mar. 22, 1999, with Ser. No. 09/274,078 which is herein incorporated by reference.

Referring to FIG. 3 the board contains 3 quad-PHY devices 300 which interface to external Ethernet ports 302. An example of the devices which can be utilized are the LXT974 QUAD-PHY device manufactured by Level One Communications.

An Ethernet switch 310 is formed from Ethernet switch port controller devices 308, which in a preferred embodiment are the Ethernet switch port controllers sold by PMC-Sierra, Inc., with part number PMC3370. A description of the PMC3370 device is given in preliminary datasheet PMC-970861 which is incorporated herein by reference. The Ethernet switch port controller devices 308 are interconnected by an Ethernet switch port controller ring bus 312.

The Ethernet switch 310 is connected to a POS mapper 320 via a POS mapper/Ethernet switch bus 314. The POS mapper 320 is connected to a Bridging Transmission Convergence (BTC) device 330, which is connected to a board edge connector 340. When used as part of a SONET cross-connect, the BTC device 330 formats STS-n payloads such that a cross-connect device can readily form output payloads ranging from OC-1 to OC-192. The BTC device 330 performs pre-alignment and creates composite payloads which can be transmitted across a backplane, received by a cross-connect device, appropriately cross-connected, and routed to an output board. Although the present invention has been described in the context of a full cross-connect, the formation of the STS-n payloads from the Ethernet ports occurs independently of the cross-connect functionality.

In one embodiment, the Ethernet switch port controller devices 308 each contain 8×10/100 Mb/s Ethernet Media Access Controllers (MACs) which connect to physical devices over standard IEEE 802.3 Media Independent Interfaces (MIIs), and a single channel full-duplex gigabit ENTRE packet interface (EPI). The Ethernet switch port controller devices 308 can be configured to operate in either 8×10/100 mode or ENTRE mode. The IEEE 802.3 MII standard defines the MII interfaces and is incorporated herein by reference. In one embodiment the MII interface is used in a non-standard mode with clock gapping used to control the data transfer rate.

In one embodiment of the present invention, data is transferred between the Ethernet switch 310 and the POS mapper 320 over the POS mapper/Ethernet switch bus 314 in one of three modes. In a first mode, 6 MII ports are used on each Ethernet switch port controller device 308, with clock gapping from the POS mapper 320 used to transfer data at STS-1 rates. In a second mode, 4 MII ports are used, with clock gapping used to establish an STS-3C data transfer rate of 155.55 Mb/s. Clock gapping, in which clock cycles are skipped to control a data transfer rate, is well known to those skilled in the art. In a third mode, the MII MACs are bypassed to achieve operation at 311 Mb/s or 622 Mb/s.

By establishing variable rate connections between the POS mapper 320 and the Ethernet switch port controller devices 308 it is possible to map information from the external Ethernet ports 302 at prescribed data rates to the POS mapper 320. The use of a variable rate connection allows data to be routed into an appropriate OC-n connection.

The POS mapper 320 provides data control for transfer of data from the Ethernet switch 310, with the POS mapper 320 acting as the master and the Ethernet switch port controller 308 acting as the slave. The POS mapper 320 provides the functionality of Highspeed Data Link Control (HDLC)-like framing and escape sequences. The HDLC-like framing can be used in the POS mapper 320, as specified in the IETF RFC 1662, entitled "PPP in HDLC-like framing" which is incorporated herein by reference. In one embodiment, the HDLC-like framing is used without the use of the Point-To-Point Protocol (PPP). Alternatively, the PPP can be utilized as described in the IETF RFC 1662. The HDLC-like framing is based on the use of a defined flag sequence, control and frame check sequence fields, address and control field compression, and the use of transparent escape sequences. Such techniques are well known to those skilled in the art.

Figure 4:
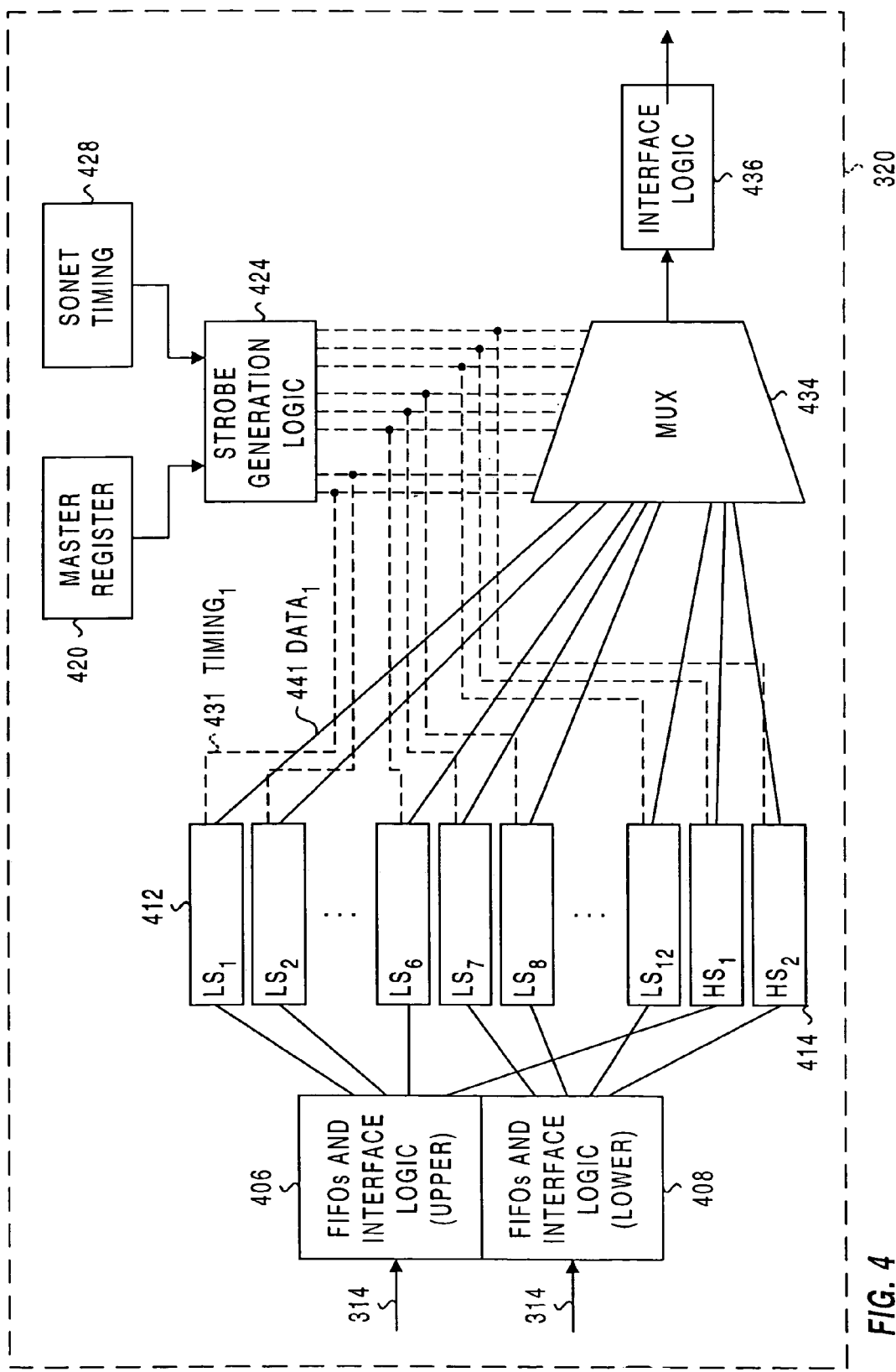
FIG. 4 illustrates a block diagram for a POS mapper.

FIG. 4 represents a block diagram for the POS mapper 320. In a preferred embodiment, the POS mapper 320 is realized in a Xilinx XCV600 Field Programmable Gate Array (FPGA). The POS mapper 320 can also be realized in an Application Specific Integrated Circuit (ASIC). As one skilled in the art would know, other hardware implementations are possible, and the POS mapper 320 can also be realized in software.

Referring to FIG. 4, an upper First-In-First-Out (FIFO) and interface logic unit 406 is connected to one of the Ethernet switch port controller devices 308 via the POS mapper/Ethernet switch bus 314. A lower FIFO and interface logic unit 408 is similarly connected to an Ethernet switch port controller device 308 via the POS mapper/Ethernet switch bus 314. The upper FIFO and interface logic unit 406 and the lower FIFO and interface logic unit 408 provide the clock gapping and control logic functionality which receives data from the Ethernet switch port controller device 308 in one of the MII or ENTRE modes, as previously described.

FIG. 4 illustrates the low speed variable rate POS mappers 412 which are replicated as units $LS_1$ through $LS_{12}$. The low speed variable rate POS mappers 412 are structured for byte wide operation at 38.88 MHz. While capable of operating at an STS-6c data rate, in one embodiment rates in the range of STS-1c to STS-3c are used. The upper six low speed variable rate POS mappers 412 $LS_1$–$LS_6$ are connected to the upper FIFO and interface logic unit 406 and the lower six low speed variable rate POS mappers 412 $LS_7$–$LS_{12}$ are connected to the lower FIFO and interface logic unit 408.

Two high speed variable rate POS mappers 414 $HS_1$ and $HS_2$ are also utilized, with $HS_1$ being connected to the upper FIFO and interface logic unit 406 and $HS_2$ being connected to the lower FIFO and interface logic unit 408. The high speed variable rate POS mappers 414 are structured for 2-byte wide operation at up to STS-12c rates.

To control the reading of the data from the low speed variable rate POS mapper 412 and the high speed variable rate POS mapper 414, a strobe generation logic 424 is used in conjunction with a master register 420, the contents of which are illustrated in FIG. 6, and a SONET timing block 428, which generates timing signals which are synchronous with the SONET network.

As illustrated in FIG. 4, a mux 434 is used to combine the data from the low speed variable rate POS mappers 412 and the high speed variable rate POS mappers 414. An interface logic 436 is used to interface the signals to the next logic block and put the combined data signals in a format which is compatible with the output card 234 or the BTC device 330.

FIG. 5 illustrates the various combinations of SONET rates that can be utilized in forming the multiplexed signal in the mux 434. As shown, a combination of 12 STS-1 streams (#1) can be used, 9 STS-1 and 1 STS-3C (#2), or other configurations as illustrated in FIG. 5. In one embodiment, the STS-9C combination is not supported, thus providing only 10 combinations.

FIG. 6 illustrates the contents of the master register 420. The bits are used to configure the POS mapper 320 for the appropriate rate/port combinations for reading data from the low speed variable rate POS mapper 412 and the high speed variable rate POS mapper 414. Bits 0–11 of the master register 420 correspond to STS rates 1–12 respectively. The default value for each bit is a zero indicating that the particular STS rate is used. A value of one indicates that the particular STS rate is not used. If a zero is located at a certain bit, the next bit corresponds to an STS-1 rate. This resetting of the STS values to the bits allows the same STS rate to be used several times, thus allowing the combinations of FIG. 5 to be obtained.

For example, if the master register 420 is set to '000000000000' 12 independent STS-1 streams will be formed (combination #1). That is, the next bit continually applies to an STS-1 rate since a zero was located in the previous bit. If the master register 420 is set to '111111111110' an STS-12c stream is formed (combination #12). If the master register 420 is set to '110110110110' four STS-3c streams are formed (combination #5) as bits 3, 6 and 9 are reassigned to an STS-1 rate so that bits 5, 8 and 11 correspond to an STS-3 rate.

Figure 7:
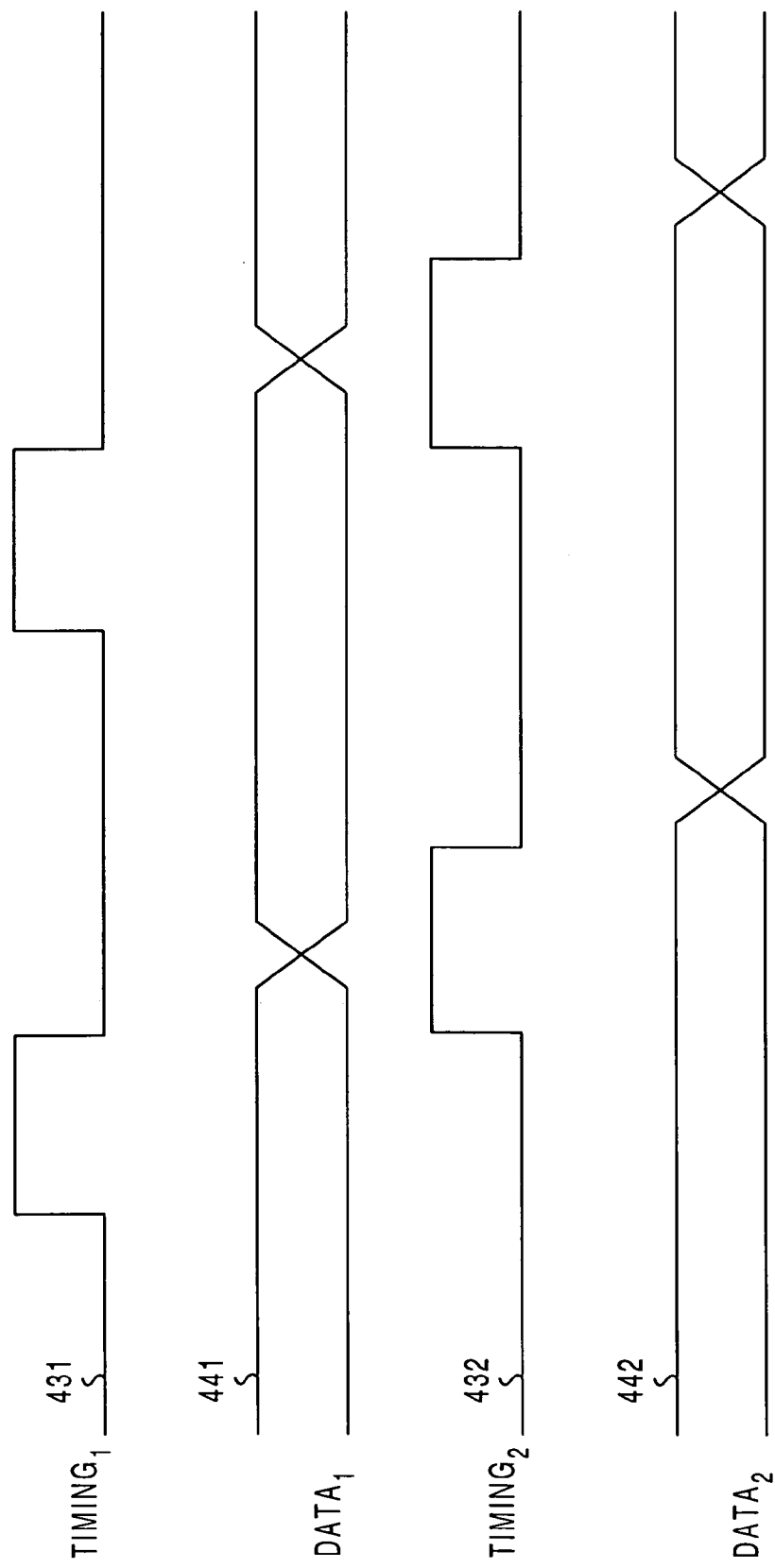
FIG. 7 illustrates the data and timing signals.

FIG. 7 illustrates a timing signal 431 and a data signal 441 of FIG. 4. As can be seen, the timing signal 431 acts as a data enable signal which allows the data signal 441 to be read from the low speed variable rate POS mappers 412 and the high speed variable rate POS mappers 414. FIG. 7 also illustrates a second timing signal 432 and a second data signal 442. As can be seen in FIG. 7, the timing signals can be staggered to allow data to be read out at the appropriate time and to be combined with other data signals in the mux 434. The strobe generation logic 424 generates the appropriate timing signals 431 in accordance with the master register 420 so as to obtain the appropriate combination of STS rates illustrated in FIG. 5. For example, if the master register 420 was set to '000000000000', then the strobe generation logic 424 would generate timing signals 431 necessary to obtain twelve STS-1 streams (combination #1 of FIG. 5).

Figure 8:
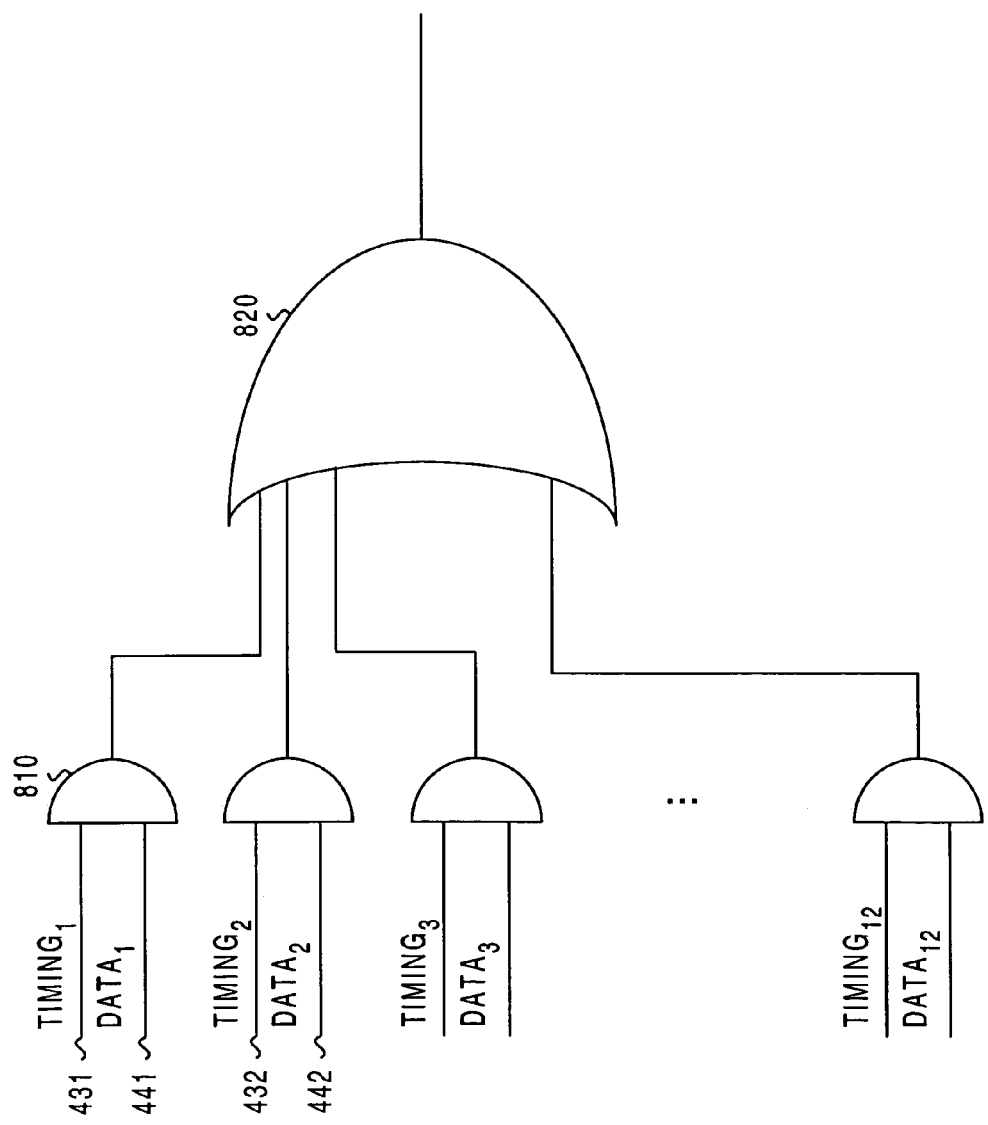
FIG. 8 illustrates the multiplexing of the signals.

FIG. 8 illustrates logic which can be used to create the multiplexed signal. This logic can reside in the mux 434 of FIG. 4. Using an AND gate 810 it is possible to combine data signal 441 with the timing signal 431 and subsequently combine all of the data signals in an OR gate 820. The data signals can be a parallel bus which is 8 bits wide. When used as a parallel bus, the timing signal 431 is fanned to the inputs of the AND gate 810. Other width buses can be utilized, in which case the timing signal 431 is fanned out across the width of the bus. Other combinations of gates can be used to achieve this functionality and are known to those skilled in the art.

In summary, the invention provides the ability to combine packet data into SONET streams operating at different rates and to transmit those streams over various SONET interfaces. The combinations, as illustrated in FIG. 5, can be obtained by combining the contents of the master register 420 with the logic in the strobe generation logic 424 to produce data signals and timing signals which support the reading of data at the appropriate data rates from buffers. The read data can be combined in a multiplexor to form a final SONET payload.

The present invention has been illustrated for the combining and multiplexing of packets. The techniques illustrated can be used to construct similar circuits for separating and demultiplexing SONET streams of varying data rates into packets for transmission on packet based networks, thus forming a WAN to LAN system.

The invention has been described as based on circuits having a bandwidth granularity of STS-1, equivalent to a data rate of 51.84 Mb/s. The invention can also be realized using Virtual Tributary-1.5 (VT1.5) circuit granularity, with the circuits operating at a rate 1.728 Mb/s. Other data rates can be utilized as the basis for the bandwidth granularity, including VT2, VT3, and VT6 rates.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A Local Area Network (LAN) to Wide Area Network (WAN) switch comprising:
   (a) one or more LAN ports;
   (b) a plurality of WAN ports; and
   (c) an integrated circuit comprising a WAN port framer for receiving data from said at least one LAN port, and for mapping the received data into said plurality of WAN ports, said mapping of said received data into a WAN port selected by programming said WAN port framer without programming said integrated circuit wherein said programming selects a data transfer rate from said at least one LAN port to said selected WAN port.

2. The LAN to WAN switch described in claim 1, wherein said at least one LAN port comprises an Ethernet port operating in the range of 10 Mb/s to 10 Gb/s.

3. The LAN to WAN switch described in claim 1, wherein at least one WAN port operates at a VT-1.5 rate or a multiple thereof.

4. The LAN to WAN switch described in claim 1, wherein said at least one WAN port operates at an STS-1 rate or a multiple thereof.

5. The LAN to WAN switch described in claim 1, wherein said programmable WAN framer produces a combination of STS-n output signals and wherein the combination of the STS-n output signals has a bandwidth equivalent to at least an STS-12 signal.

6. The apparatus of claim 1 wherein said WAN port framer has at least one register, and programming of said WAN port framer comprises setting bits in said at least one register.

7. The apparatus of claim 6 wherein programming of said WAN port framer comprises setting bits in said at least one register only.

8. The apparatus of claim 7, wherein programming of said WAN port framer comprises setting no more than 12 bits in said at least one register.

9. The apparatus of claim 1, wherein at least two of said WAN ports operate at different transfer rates from each other.

10. The apparatus of claim 1, wherein said integrated circuit comprises an FPGA.

11. A Local Area Network (LAN) to Wide Area Network (WAN) switch comprising:
    (a) at least one LAN port;
    (b) a packet switch, connected to said at least one LAN port, for providing concentration of traffic from said at least one LAN port;
    (c) a plurality of WAN output ports; and
    (d) an integrated circuit comprising a WAN port framer connected to said packet switch, for receiving data from said packet switch, and for mapping the received data into at least one of said output WAN ports, said mapping of said received data into a WAN port selected by programming said WAN port framer without programming said integrated circuit wherein said programming selects a data transfer rate from said at least one LAN port to said selected WAN port.

12. The LAN to WAN switch described in claim 11, wherein said at least one LAN port comprises an Ethernet port operating in the range of 10 Mb/s to 10 Gb/s.

13. The LAN to WAN switch described in claim 11, wherein said at least one WAN output port operates at an STS-1 rate or a multiple thereof.

14. The LAN to WAN switch described in claim 11, wherein said at least one WAN output port generates an OC-n compatible signal at a data rate in the range of 50 Mb/s to 10 Gb/s.

15. The apparatus of claim 10 wherein said WAN port framer has at least one register, programming of said WAN port farmer comprises setting bits in said at least one register.

16. The apparatus of claim 15 wherein programming of said WAN port framer comprises setting bits in said at least one register only.

17. The apparatus of claim 16, wherein programming of said WAN port framer comprises setting no more than 12 bits in said at least one register.

18. The apparatus of claim 11, wherein at least two of said WAN ports operate at different transfer rates from each other.

19. The apparatus of claim 11, wherein said integrated circuit comprises an FPGA.

20. A Local Area Network (LAN) to Wide Area Network (WAN) switch comprising:
(a) a plurality of LAN ports;
(b) a packet switch connected to said plurality of LAN ports, wherein said packet switch creates a virtual LAN from a subset of said plurality of LAN ports; and
(c) an integrated circuit comprising a WAN port framer connected to said packet switch and a plurality of WAN output ports for receiving data from said packet switch, and for mapping the received data into at least one WAN output port at a data transfer rate responsive to programming of said WAN port framer without programming said integrated circuit, wherein said programming selects said mapping and said data transfer rate.

21. The LAN to WAN switch described in claim 20, wherein said at least one plurality of LAN ports comprise an Ethernet port operating in the range of 10 Mb/s to 10 Gb/s.

22. The LAN to WAN switch described in claim 20, wherein said at least one WAN port operates at an STS-1 rate or a multiple thereof.

23. The LAN to WAN switch described in claim 20, wherein said at least one WAN port generates an OC-n compatible signal at a data rate in the range of 50 Mb/s to 10 Gb/s.

24. The apparatus of claim 23 wherein said WAN port framer has at least one register, programming of said WAN port framer comprises setting bits in said at least one register.

25. The apparatus of claim 24 wherein programming of said WAN port framer comprises setting bits in said at least one register only.

26. The apparatus of claim 25, wherein programming of said WAN port framer comprises setting no more than 12 bits in said at least one register.

27. The apparatus of claim 20, wherein at least two of said WAN output ports operate at different transfer rates from each other.

28. The apparatus of claim 20, wherein said integrated circuit comprises an FPGA.

29. A method for transporting data from a Local Area Network (LAN) to a Wide Area Network (WAN) in a re-configurable manner, the method comprising the steps of:
(a) receiving LAN data on at least one LAN port; and
(b) mapping the LAN data into at least one STS-1 transport stream, wherein the mapping can be selectively reconfigured to permit traffic from a LAN ports to be mapped into m STS-1 transport streams for a data transfer rate selected by programming without physically changing any underlying circuitry performing the data transporting method, wherein the LAN data mapping step comprises programming at least one register in the underlying circuitry.

30. The method described in claim 29, further comprising the step of
(c) transmitting the at least one STS-1 transport stream to a WAN compatible output port, wherein the WAN compatible output port provides transport for a plurality of STS-1 transport streams.

31. The method described in claim 29, wherein said receiving LAN data includes receiving the LAN data on the at least one LAN port in the form of Ethernet packets at a data rate in the range of 10 Mb/s to 10 Gb/s.

32. The method described in claim 30, wherein the WAN compatible output port supports transmission at a rate of STS-1 or a multiple thereof.

33. The method of claim 29 wherein the LAN data mapping step comprises programming said at least one register only.

34. The method of claim 33, wherein the LAN data mapping step comprises programming no more than 12 bits in said at least one register.

35. A method for transporting data from a Local Area Network (LAN) to a Wide Area Network (WAN) in a re-configurable manner, the method comprising the steps of:
(a) receiving LAN data on at least one LAN port;
(b) concentrating and switching the received LAN data; and
(c) mapping the concentrated LAN data into at least one STS-1 transport stream at a data transfer rate;
(d) reconfiguring said mapping to permit traffic from n LAN ports to be mapped into m STS-1 transport streams at a selected data transfer rate by programming without physically changing any underlying circuitry performing the data transporting method, wherein the concentrated LAN data mapping step comprise programming at least one register in the underlying circuitry.

36. The method described in claim 35, further comprising the step of:
(d) transmitting the at least one STS-1 transport stream to a WAN compatible output port, wherein the WAN compatible output port provides transport for a plurality of STS-1 transport streams.

37. The method described in claim 35, wherein said receiving LAN data includes receiving the LAN data on the at least one LAN port in the form of Ethernet packets at a data rate in the range of 10 Mb/s to 10 Gb/s.

38. The method described in claim 36, wherein the WAN compatible output port supports OC-n optical transmission at the rate of 50 Mb/s to 10 Gb/s.

39. The method of claim 35 wherein the concentrated LAN data mapping step comprise programming said at least one register only.

40. The apparatus of claim 39, wherein said programming in said concentrated LAN data mapping step comprises setting no more than 12 bits in said at least one register.

41. The apparatus of claim 35, wherein at least two of said WAN output ports operate at different rates.

42. The apparatus of claim 35, wherein said integrated circuit comprises an FPGA.

43. A method for transporting data from a Local Area Network (LAN) to a Wide Area Network (WAN) in a re-configurable manner, the method comprising the steps of:
(a) receiving LAN data on a plurality of LAN ports;
(b) forming a virtual LAN from a subset of the plurality of LAN ports;
(c) receiving data from the virtual LAN; and
(d) mapping the data from the virtual LAN into at least one STS-1 transport stream at a data transfer rate;
(e) reconfiguring the mapping to permit traffic from n LAN ports to be mapped into m STS-1 transport streams at a selected data transfer rate by programming without physically changing any underlying circuitry performing the data transporting method, wherein the data mapping step comprises programming at least one register in the underlying circuitry.

44. The method described in claim 43, further comprising the step of
(c) transmitting the at least one STS-1 transport stream to a WAN compatible output port, wherein the WAN compatible output port provides transport for a plurality of STS-1 transport streams.

45. The method described in claim 43, wherein said receiving LAN data including receiving the LAN data on the plurality of LAN ports in the form of Ethernet packets received at a data rate in the range of 10 Mb/s to 10 Gb/s.

46. The method described in claim 44, wherein the WAN compatible output port supports OC-n optical transmission at the rate of 50 Mb/s to 10 Gb/s.

47. The method of claim 43 wherein the data mapping step comprises programming said at least one register only.

48. The method of claim 47, wherein the data mapping step comprises programming no more than 12 bits in said at least one register.

* * * * *